United States Patent [19]
Bylenga

[11] Patent Number: 5,634,317
[45] Date of Patent: Jun. 3, 1997

[54] PACKAGING APPARATUS AND PROCESS

[75] Inventor: Peter G. Bylenga, Greenville, S.C.

[73] Assignee: PCM Packaging Concepts & Materials, Inc., Greenville, S.C.

[21] Appl. No.: 591,114

[22] Filed: Jan. 25, 1996

Related U.S. Application Data

[63] Continuation of Ser. No. 344,954, Nov. 25, 1994, abandoned.

[51] Int. Cl.$^6$ ................................................ B65B 41/18
[52] U.S. Cl. ........................ 53/170; 53/175; 53/204; 452/32; 452/34
[58] Field of Search ................... 53/175, 449, 170, 53/575, 576, 581, 204, 409; 493/294, 297; 452/34, 32, 33, 35, 21, 22; 206/802, 205; 383/109, 111

[56] References Cited

U.S. PATENT DOCUMENTS

| | | | |
|---|---|---|---|
| 2,521,833 | 9/1950 | Dahl | 53/409 |
| 2,540,272 | 2/1951 | Malmstrom et al. | 53/409 |
| 2,822,571 | 2/1958 | Johnson . | |
| 3,061,170 | 10/1962 | Baker | 229/55 |
| 3,437,195 | 4/1969 | Hill | 53/409 |
| 4,033,382 | 7/1977 | Eichin | 53/409 |
| 4,346,738 | 8/1982 | Martinek | 53/409 |
| 4,411,358 | 10/1983 | Bennwik et al. | 206/45.34 |
| 4,610,844 | 9/1986 | Matthews et al. | 426/641 |
| 4,734,956 | 4/1988 | Frey et al. | 493/294 |
| 4,861,632 | 8/1989 | Caggiano | 383/109 |
| 4,886,373 | 12/1989 | Corella | 383/104 |

*Primary Examiner*—John Sipos
*Assistant Examiner*—Gene L. Kim
*Attorney, Agent, or Firm*—Hardaway Law Firm P.A.

[57] ABSTRACT

A packaging apparatus and process for producing and using the same is provided having a tubular lining material defining a hollow-space therein with the lining material being folded outwardly over itself providing a chamber in which a casing material is positioned circumferentially over an inner layer of the lining material.

20 Claims, 4 Drawing Sheets

5,634,317

PACKAGING APPARATUS AND PROCESS

This application is a file wrapper continuation of application Ser. No. 08/344,954, filed Nov. 25, 1994 abandoned.

BACKGROUND OF THE INVENTION

This invention relates generally to a packaging apparatus, and more particularly, to a packaging apparatus that makes packaging various products simpler, cleaner and more efficient.

PRIOR ART

The art of packaging extruded products, especially meat-based products, by high-speed methods is well-developed.

U.S. Pat. No. 4,886,373 to Corella discloses a peripherally sealed, flexible, dispensing package having a self-supporting, stand-up configuration. The package comprises a circumferential, flexible wall defining a compartment containing fluidic material, an inverted portion of the flexible wall that extends into the compartment, and a self-supporting rim formed by the confluence of the flexible wall with the inverted portion. The package is made by inverting one wall of a traditional "lay-flat" dispensing package.

U.S. Pat. No. 3,061,170 to Baker discloses a multi-wall bag and its method of manufacture to make a leak-proof package. The multi-wall bag is made by placing a leak-proof constriction in an intermediate position along a length of plastic tubing and manipulating the tubing forming a double-walled container wherein one section is superimposed over the other section and the leak-proof barrier is positioned at the bottom of the container and between the inner section and the outer section which has been superimposed over the inner section.

U.S. Pat. No. 4,411,358 to Bennwik et al. discloses a package having an inner and an outer bag. The outer bag is light impermeable and the inner bag is light permeable, and the bag unfolds for use wherein the light permeable bag is on the outside to permit visibility of the contents.

When packaging extruded meat-based product, it is desirable for the product to be packaged in some material, such as a tubular netting, to contain the product. It has been, and continues to be, desirable to expose a material containing meat-based product to liquid smoke or other material to enhance and preserve the flavor or life of the meat-based product. Furthermore, the liquid material allows the netting to be more easily stripped off the meat product. In the past, it has been necessary to use large amounts of liquid smoke or other material to saturate the container material.

Accordingly, despite the existence of packaging techniques and apparatuses for extruded-type products, room for improvement exists within the art, especially relating to the packaging of meat-based or low viscosity products.

SUMMARY OF THE INVENTION

It is thus an object of this invention to provide a novel packaging apparatus and process of producing and using the same.

It is another object of this invention to provide a packaging apparatus and process of producing and using the same that can be flexible or rigid and can be used in a variety of diverse applications.

It is a further object of this invention to provide a packaging apparatus and process of producing and using the same that is ideally suited for packaging raw meat.

It is a further object of the invention to provide a packaging apparatus and process of producing and using the same for packaging raw meat in which the package can be treated such as by saturation with a viscous solution.

It is a further object of the invention to provide a packaging apparatus and process for producing and using the same which is easily interfaced with a horn of a meat packaging machine.

It is a further object of the invention to provide a packaging apparatus and process for producing and using the same which can come in a variety of tubular shapes.

It is a further object of the invention to provide a packaging apparatus and process for producing and using the same which can alternatively be used to protect fragile items placed therein from breakage.

It is yet a further object of the invention to provide a packaging apparatus and process for producing and using the same which can alternatively be used for collecting spilled liquids.

These as well as other objects are accomplished by a packaging apparatus comprising a tubular lining material, defining a hollow space therein and being folded outwardly over itself providing an inner layer and an outer layer and a chamber therebetween. A tubular netting or shirred material is positioned within the chamber substantially between the inner and outer layer. The process for producing the packaging apparatus according to this invention comprises providing a tubular lining material, placing a casing material around a portion of the lining material, and folding the lining material outwardly at an open end and pulling it toward an opposite end of the lining material forming an inner and outer layer, with the casing material therebetween.

DETAILED DESCRIPTION

In accordance with this invention, it has been found that a package apparatus and process for producing and using the same can be provided which although primarily suitable for packaging a variety of extruded types of products, such as meat, poultry and other low viscosity products, has many other divergent uses and constructions. While these are the primary advantages of the present invention, many other advantages and features will become apparent to those skilled in the art from a reading of the following description given with reference to the various figures of drawings.

Figure 1:
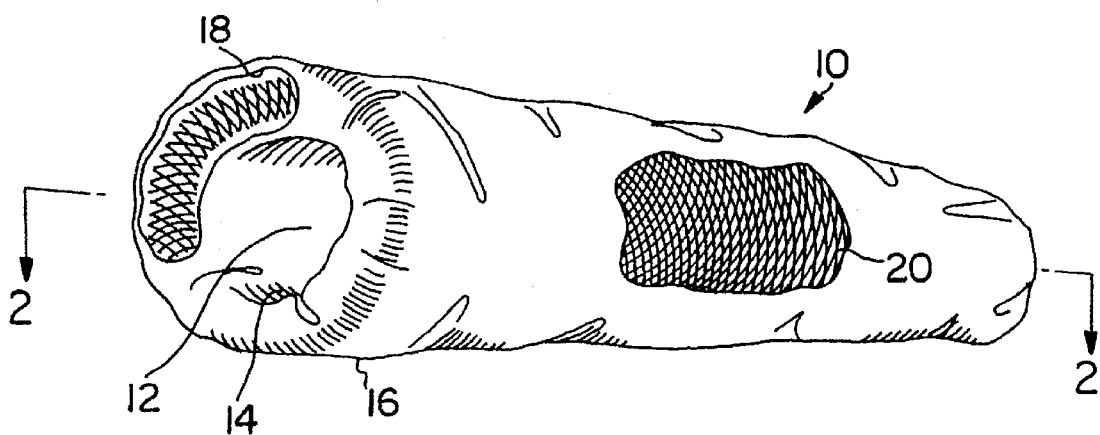
FIG. 1 of the drawings is a perspective view of a package apparatus constructed in accordance with this invention.

FIG. 1 of the drawings is a perspective view of the finished packaging apparatus 10 according to the present invention. As shown in FIG. 1, packaging apparatus 10 comprises a lining material which is preferably tubular in form and defines a cylindrical hollow-space 12 therein. It should be noted that while the figures herein depict a cylindrically-shaped packaging apparatus 10, packaging apparatus 10 need not be cylindrical. Accordingly, "tubular" as used herein should be taken to mean any hollow shape, including but not limited to, cylindrical, rectangular, square, hexagonal, etc. Various lining materials can be used depending upon the intended use of the package. For example, as will be described in detail below, the lining may be made from either a permeable or impermeable plastic material or a plastic netting.

During the process for producing packaging apparatus 10, as will be described below, the lining material is folded or inverted outwardly over itself at an open end of the lining material to provide an inner layer 14 and an outer layer 16 of the lining material with a chamber 18 formed between inner layer 14 and outer layer 16. In accordance with this invention, a casing material, illustrated in FIG. 1 in its preferred embodiment as a tubular netting 20, is positioned inside chamber 18 circumferentially over inner layer 14. It is preferred that tubular netting 20 be a highly absorbent cotton or plastic and be gathered or shirred within chamber 18 between inner layer 14 and outer layer 16.

Figure 2:
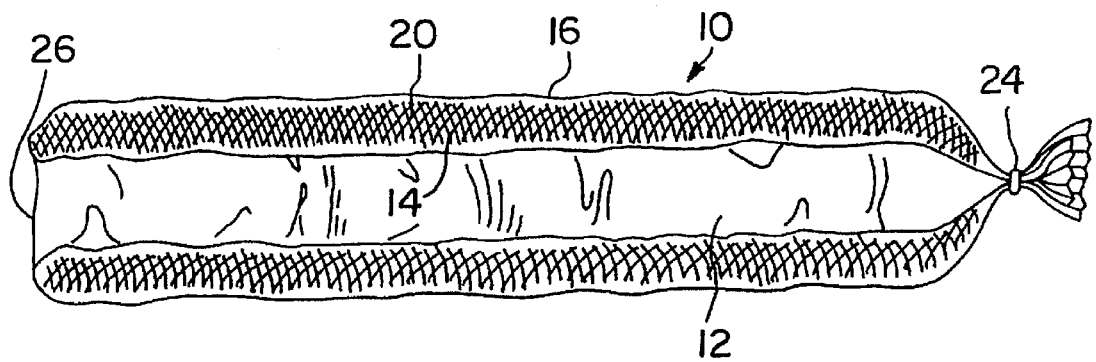
FIG. 2 of the drawings is a cross-section view of the apparatus illustrated in FIG. 1 of the drawings.
Figure 9:
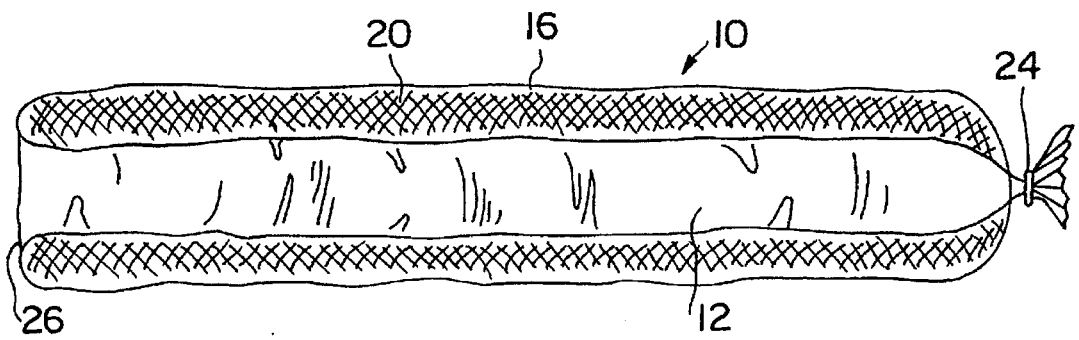
FIG. 9 of the drawings illustrates a packaging apparatus according to the present invention in which one of the ends of the lining material is closed.

FIG. 2 of the drawings is a sectional view of the finished packaging apparatus 10 of FIG. 1 and more clearly illustrates inner layer 14 and outer layer 16 with tubular netting 20 gathered therebetween. As shown in FIG. 2, the lining material is an elongated, tubular, material wherein the tubular material is folded outwardly over itself at opening 26 and this folded portion is pulled back over the other end of the lining material. The two ends of the lining material are then joined together, such as at 24, by a clip, a knot, or a heat-seal (hereinafter jointly referred to as "seal 24"), to encapsulate tubular netting 20 fully within chamber 18 between inner layer 14 and outer layer 16 of the bag. In the case that tubular lining material has a closed end, the closed end can be sealed to the open end as shown in FIG. 9.

Finally, FIG. 2 also illustrates the hollow-space 12, defined by the inner layer 14 of the lining material. Hollow-space 12, as will be described below, is especially suitable for receiving a food dispensing horn entirely therein. However, as it will also be described below, a fragile item may be placed in hollow-space 12 to protect the item from breakage.

Figure 10:
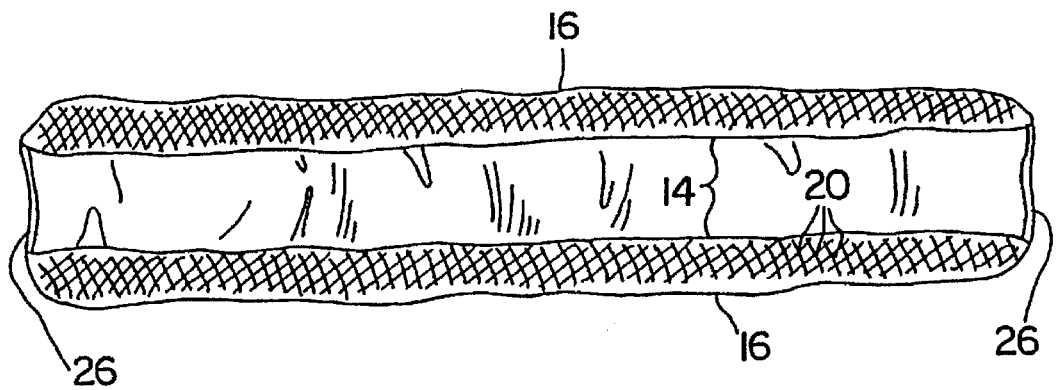
FIG. 10 of the drawings illustrates a packaging apparatus according to the present invention which is open at both its ends.

Before describing how the packaging apparatus 10 of FIGS. 1 and 2 is made and used, reference should be made to FIG. 10 which shows an alternative configuration of packaging apparatus 10. In this embodiment, packaging apparatus 10 has no closed ends and the open ends of inner layer 14 and outer layer 16 are sealed together.

The structure of packaging apparatus 10, as previously described, therefore allows any liquid or chemical treatment to be added, as desired, within chamber 18 to saturate tubular netting 20 and retain the liquid entirely within apparatus 10. This feature is advantageous as it prevents unnecessarily wasting liquid, and it allows liquid to be in chamber 18 with tubular netting 20 while the packaging apparatus is in storage awaiting use. In addition, this method promotes convenience and ease of use with a device producing extruded food product, as discussed below.

Figure 3:
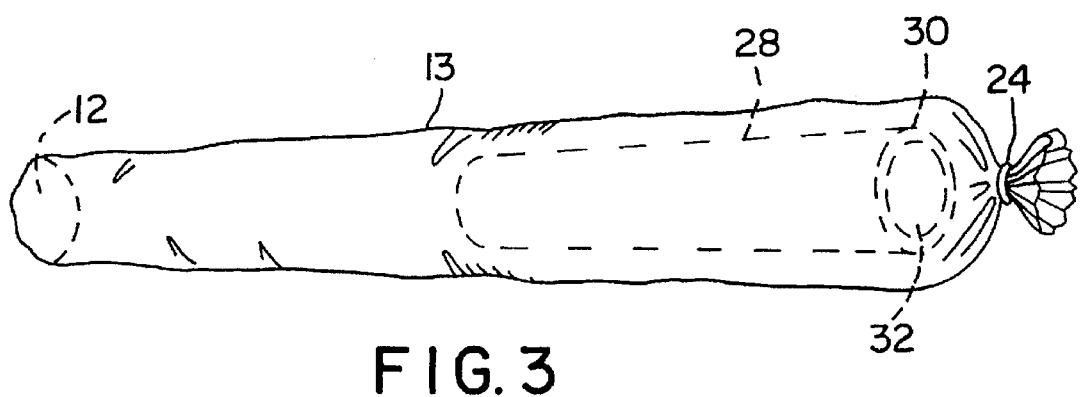
FIGS. 3 through 7 of the drawings illustrate the preferred process of producing the package apparatus according to this invention.
Figure 4:
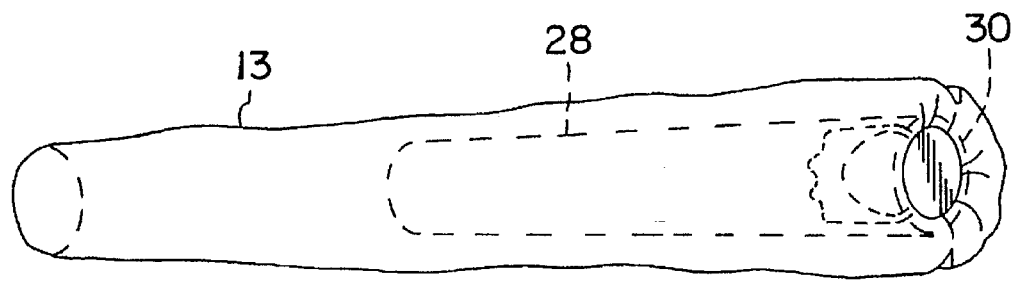

FIGS. 3 through 7 of the drawings illustrate the preferred process of producing a packaging apparatus as illustrated in FIGS. 1 and 2. As shown in FIG. 3, the process is initiated by providing a tubular lining material, illustrated in its preferred embodiment as plastic bag 13, having two open ends, and defining a hollow-space 12 therein. A support structure, illustrated in FIG. 3 in its preferred embodiment as a tubular, plastic pipe 28, having an open end 30 and defining a hollow-space 32 therein, is inserted inside plastic bag 13 so that open end 30 of pipe 28 is proximate to one end of plastic bag 13. This end is then sealed closed, as at 24. Optionally, as shown in FIG. 4, it is possible that this open end of the bag may be secured in position by use of a core plug. It is envisioned that support structures of other configurations can be used in accordance with the process of producing a packaging apparatus according to this invention. For example, support structure 28 can be a square or rectangular tube or a flattened box. When shapes other than cylindrical are employed, it is foreseen that the particular lining material and method by which the seals will be formed will have to be modified so that upon removal of the form, the package will retain the complex shape. In the preferred process of this invention, plastic bag 13 is approximately twice the length of pipe 28, and pipe 28 can be inserted into plastic bag 13, or plastic bag 13 can be drawn over pipe 28. It is preferred that plastic pipe 28 be positioned within plastic bag 13 so that the open end of pipe 28 is near an end of plastic bag 13.

Figure 5:
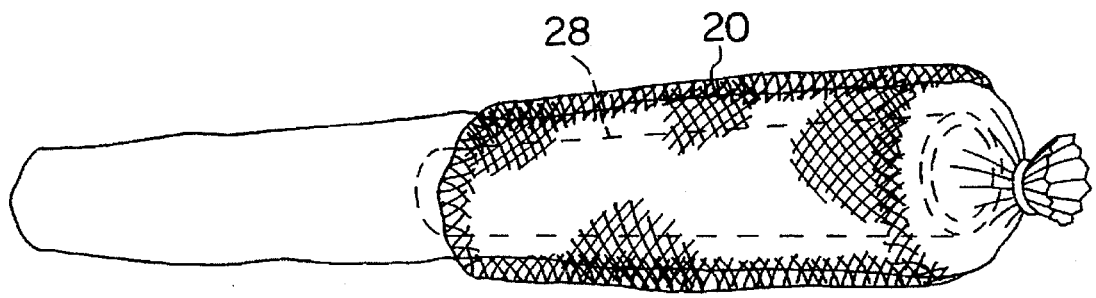

Next, according to the process of this invention, as illustrated in FIG. 5, a casing material is circumferentially placed around a portion of the lining material. The casing material, illustrated in its preferred embodiment as tubular netting 20, is pulled over a portion of the lining material. In its preferred embodiment, tubular netting 20 is gathered or shirred substantially over that portion of the lining material that circumferentially surrounds pipe 28. For a typical approximately four-foot long packaging apparatus 10, approximately 100 feet of netting 20 is placed around the lining material.

Figure 6:
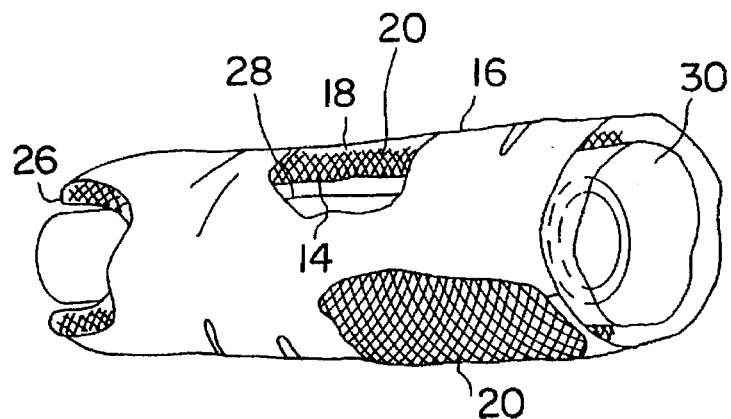

As illustrated in FIG. 6 of the drawings, and in accordance with the preferred process of this invention, the other open end of the lining material, illustrated as plastic bag 13, is folded outwardly and pulled back towards the other end of the bag. The folded over portion of the bag is pulled toward the other end of the bag, preferably over the entire tubular netting 20, so that the formerly distant opposite ends of the bag are now proximate to one another. In this manner, hollow-space 12, defined by bag 13, is reduced in length and is now defined by inner layer 14. Opening 26 to hollow-space 12, as illustrated in FIG. 2, exists at the area of the fold. Since tubular netting 20 has been already placed in position substantially over that part of the bag which circumferentially surrounds pipe 28, it is envisioned that the portion of the bag which is folded outwardly and pulled back, is pulled back over itself and tubular netting 20 to a point where the pulled-back end of the bag is proximate to the other end such that the two ends may be joined together by another seal. Pulling the pulled-back portion back any further could cause tubular netting 20 to be pulled out of its originally placed position and the first sealed end to be drawn down such that it cannot be attached to the pulled-back end. In the embodiment of FIG. 4, in which the plug is used to maintain the bag in its position, the plug will be removed so that the two bags ends may be sealed together. Although it is described herein that the casing material illustrated as tubular netting 20 be positioned on a portion of the bag prior to folding a portion of the bag outwardly and pulling the folded portion over the casing material, it is envisioned that the bag could be folded outwardly and pulled over itself so opposing ends of the bag are proximate one another and creating the inner space or chamber 18 between inner layer 14 and outer layer 16 prior to placement of the casing material. For manufacturing simplication, and in accordance with the preferred process of this invention, however, it is illustrated herein that tubular netting 20 be gathered into place prior to pulling the folded portion of the bag back over the casing material.

The final steps, according to the process of this invention, comprise removing pipe 28 from within hollow-space 12, inserting any optional desired liquids such as chemical treatments, e.g., liquid smoke for meat products; water; or other desired treatments, within chamber 18; and, sealing the ends of the bag together to fully encapsulate tubular netting 20 between inner layer 14 and outer layer 16. When liquid materials are added to the netting 20, it is important that the lining material be made from an impermeable material so that there is no leakage and the packaging apparatus can be stored without soiling anything nearby. However, when no liquid materials will be added or the end-user will add the liquid materials later, the lining material may be made from a permeable material or even a plastic net.

Figure 7:
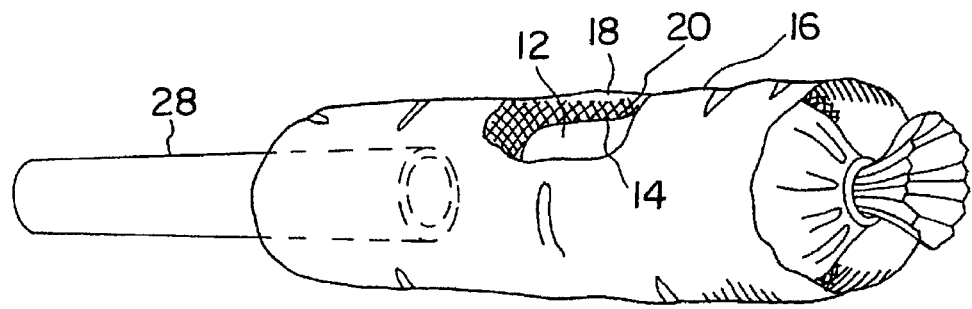

FIG. 7 illustrates pipe 28 being removed from hollow-space 12, however, the ends of the plastic bag are not illustrated as being sealed together at this point, since it is at this point that any liquids that are desirable are inserted into and maintained within chamber 18 where tubular netting 20 is exposed to and can absorb, or be saturated by, such liquid depending on the amount. Furthermore, it is possible that the liquids may be added prior to the removal of the pipe 28; all that is required is the bag ends not being sealed together.

After the liquid or any other chemical treatment is inserted into chamber 18, the ends of the bag can be sealed together, such as at 24 in FIG. 2, to close off hollow-space 12. The purpose of sealing two ends together is to totally encapsulate netting 20 within chamber 18. This can be done by dipping the two ends together which seals off hollow space 12 or sealing inner layer 14 to outer layer 16 circumferentially, thus maintaining openings on both ends of packaging apparatus 10. This fully encapsulates tubular netting 20, and any liquid that might have been added, within chamber 18 between inner layer 14 and outer layer 16. The ends of the bag are preferably hermetically sealed together. The package can then be stored until needed and is easily transportable.

The packaging apparatus 10, and its method for construction, having been described, the various ways in which the package may be used will be described.

Figure 8:
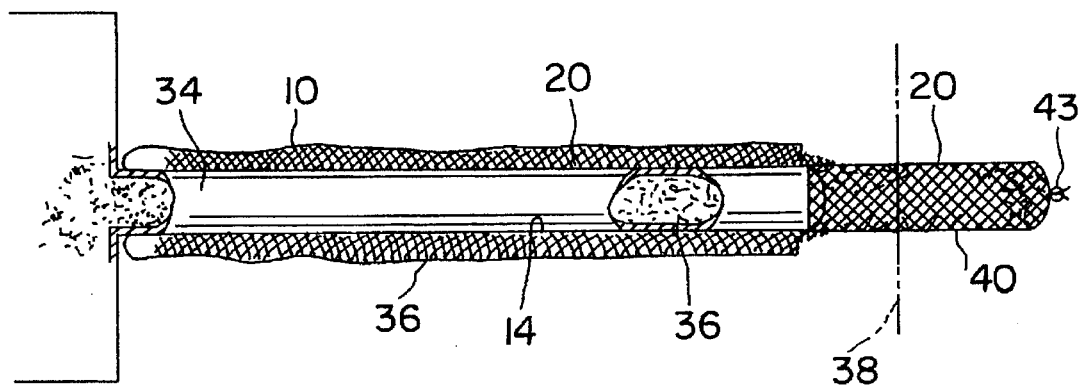
FIG. 8 of the drawings illustrates the process of packaging an extruded product according to the present invention.

As described above, the primary use of packaging apparatus 10 is attachment to a device that produces and packages extruded product, such as meat. FIG. 8 of the drawings illustrates packaging apparatus 10 being used with a device producing extruded product. Horn 34 is longer than packaging apparatus 10. The device producing the extruded product, also known as a meat sizing machine, can be of any conventional type. A packaging apparatus 10, as illustrated in FIGS. 1 and 2 of the drawings, is preferably fitted to loading horn 34 by placing opening 26 of packaging apparatus 10 onto and around the loading horn as illustrated in FIG. 8. Horn 34 will entirely pass through hollow-space 12. Either before or after placing the packaging apparatus on loading horn 34, the sealed end of packaging apparatus 10 is cut open, as illustrated in FIG. 8, to allow the product to pass through horn 34 until it reaches tubular netting 20, which will be sealed closed, such as at 43, prior to the dispensing of extruded product 36.

As loader extrudes 34 produces product 36, product 36 is forced directly against tubular netting 20, which is now free to exit chamber 18 because of the cut-open lining, and is pulled out of chamber 18 enough to fit circumferentially around product 36 as it exits horn 34 in such a way that movement of product 36 causes movement of tubular netting 20. In this manner, the gradual exit of the product from packaging apparatus 10 causes tubular netting 20 to gradually ungather and exit its enclosure as it tightly fits around the product and is pulled out of chamber 18 as product 36 is forced out of horn 34. At desired points, the product, wrapped by tubular netting 20, can be cut from the continuous flow of extruded product, such as at 38, and tubular netting 20 can be closed off (not shown) at the cut, for a finished and packaged end product 40. When all of the tubular netting has exited the chamber of the bag, the empty bag can be removed from the loading horn and the sequence can be repeated with a new packaging apparatus.

Figure 11:
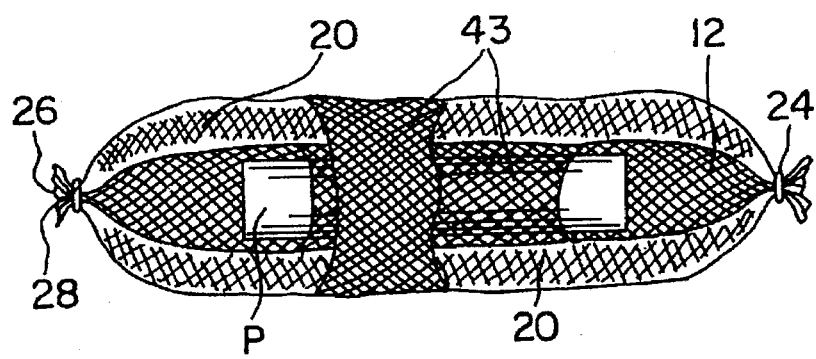
FIG. 11 of the drawings illustrates the use of a packaging apparatus according to the present invention being used as a mailer or protector of fragile items.

Packaging apparatus 10 can alternatively be used as a protective mailer or as an apparatus for protecting fragile items. For these particular uses, it is envisioned that netting 10 will not be used as a casing for an extruded product but as a protective cushion. As shown in FIG. 11, the item P to be mailed or protected will be placed into hollow-space 12 of a packaging apparatus 10 of suitable size and then the opening 26 sealed in any number of conventional ways as at 28. Thus, the item to be protected will be encapsulated within apparatus 10 and substantially protected from impact-type forces by the cushioning of netting 20. Finally, it should be noted in these particular applications, there is no requirement that the lining material be impermeable and may even comprise a plastic netting 43.

Packaging apparatus 10 has yet another use of picking up or blocking off spilt liquids. For this use, the lining material will be either a permeable material or a plastic netting, as described above. A plurality of packaging apparatuses 10 can then be placed entirely around the spill to contain the spill within the bound area and the highly absorbent and capillary nature of netting 20 will cause the spill to be drawn into netting 20. When the spilled material is fully drawn within netting 20, the apparatuses 10 will be discarded.

While the packaging apparatus according to this invention is particularly suited for use in packaging food products, it is further envisioned that the packaging apparatus has applications in packaging other products, such as more solid products like concrete, to produce the products in cylindrical shapes of desired lengths and circumferences. The packaging apparatus even has application for enclosing other types of products utilizing the casing material such as a cast for enclosing body limbs or other objects.

It is seen that the invention provides a novel packaging apparatus and process of producing and using the same. It is further seen that the invention provides a packaging apparatus and process of producing and using the same that can be flexible or rigid and can be used in a variety of diverse applications. It is still further seen that the invention provides a packaging apparatus and process of producing and using the same that is ideally suited for packaging raw meat. It is still further seen that the invention provides a packaging apparatus and process of producing and using the same for packaging raw meat in which the package can be treated such as by saturation with a viscous solution. It is still further seen that the invention provides a packaging apparatus and process for producing and using the same which is easily interfaced with a horn of a meat packaging machine. It is still further seen that the invention provides a packaging apparatus and process for producing and using the same which can come in a variety of tubular shapes. It is still further seen that the invention provides a packaging apparatus and process for producing and using the same which can alternatively be used to protect fragile items placed therein from breakage. It is still further seen that the invention provides a packaging apparatus and process for producing and using the same which can alternatively be used for collecting spilled liquids. Many variations are apparent of those in skill art and such variations are embodied within the spirit of the present invention as measured by the following appended claims.

That which is claimed is:

1. A packaging Apparatus comprising:
   a tubular lining material defining a hollow space therein, said lining material being folded outwardly over itself providing an inner layer and an outer layer with an elongated chamber therebetween; and
   an axially compressed continuous piece of soft casing material positioned in said chamber circumferentially over said inner layer;
   a closed circumferential opening between said inner and outer layers at an end of said elongated chamber opposite the fold, said circumferential opening, when opened, permits the axial dispensing of said axially compressed continuous casing material of said chamber to define a packaging sleeve.

2. The packaging apparatus according to claim 1 wherein said casing material is a tubular material.

3. The packaging apparatus according to claim 1 wherein said casing material is absorbent.

4. The packaging apparatus according to claim 1 wherein said casing material is shirred within said chamber.

5. The packaging apparatus according to claim 1 wherein said casing material is a gathered tubular netting.

6. The packaging apparatus according to claim 1 wherein said lining material is an impermeable plastic.

7. The packaging apparatus according to claim 1 wherein said lining material is a permeable plastic.

8. The packaging apparatus according to claim 1 wherein said lining material is a plastic netting.

9. The packaging apparatus according to claim 1 wherein said lining material has a first end and a second end and said lining material is folded to a position where said first and second ends are proximate one another.

10. The packaging apparatus according to claim 9 wherein a first end of said packaging apparatus defines an opening.

11. The packaging apparatus according to claim 10 wherein a second end of said packaging apparatus is closed.

12. The packaging apparatus according to claim 9 wherein said first and second ends of said lining are hermetically sealed together to fully encapsulate said casing material.

13. The packaging apparatus according to claim 10 wherein said second end of said packaging apparatus is also open, whereby said apparatus has a hollow passage completely therethrough.

14. The packaging apparatus according to claim 1 wherein said casing material is sealed within said chamber.

15. The packaging apparatus according to claim 1 wherein said lining material is folded outwardly at a point approximately one-half a length of said lining material.

16. The packaging apparatus according to claim 1 wherein said packaging apparatus is flexible.

17. The packaging apparatus according to claim 1 wherein said hollow space for containing a product is cylindrical.

18. The packaging apparatus according to claim 1 wherein said lining material is cylindrical.

19. The packaging apparatus according to claim 1 wherein said lining material is rigid.

20. The packaging apparatus according to claim one wherein first and second ends of said packaging apparatus are both closed.

* * * * *